United States Patent [19]

Veronesi et al.

[11] Patent Number: 5,101,128

[45] Date of Patent: Mar. 31, 1992

[54] SYSTEM AND METHOD FOR COOLING A SUBMERSIBLE ELECTRIC PROPULSOR

[75] Inventors: Luciano Veronesi; James A. Drake, both of O'Hara Township, Allegheny County, both of Pa.

[73] Assignee: Westinghouse Electric Corp., Pittsburgh, Pa.

[21] Appl. No.: 571,968

[22] Filed: Aug. 23, 1990

[51] Int. Cl.[5] .................. H02K 9/18; H02K 9/04; F01D 5/08
[52] U.S. Cl. .................. 310/54; 290/52; 384/472; 310/87; 440/6
[58] Field of Search .............. 310/54, 87, 90; 384/97, 384/398, 465, 472; 440/75, 83, 112, 6; 290/52

[56] References Cited

U.S. PATENT DOCUMENTS

| | | | |
|---|---|---|---|
| 4,241,959 | 12/1980 | Frister | 384/472 |
| 4,308,464 | 12/1981 | Yamamoto | 290/52 |
| 4,421,999 | 12/1983 | Beavers et al. | 310/87 |
| 4,445,046 | 4/1984 | Allegre et al. | 290/52 |
| 4,476,395 | 10/1984 | Cronin | 310/59 |
| 4,831,297 | 5/1989 | Taylor et al. | 310/87 |

FOREIGN PATENT DOCUMENTS 917475 7/1949 Fed. Rep. of Germany .
1072808 6/1967 United Kingdom .

Primary Examiner—Peter S. Wong
Assistant Examiner—D. L. Rebsch

[57] ABSTRACT

Both a closed system and method for cooling a submersible propulsor unit for a water vehicle is provided for a unit of the type that includes a submersible motor having a shaft connected to a propeller, and a housing containing the motor. The system comprises a motor cooling assembly that includes a shaft seal for conducting the shaft outside of the housing while preventing ambient water from entering the housing, a liquid contained within the housing for cooling the motor, a heat exchanger for thermally connecting but mechanically isolating the liquid from the ambient water, an impeller (102) for recirculating the liquid through both the motor and the heat exchanger, and a bellows (128) for equilibrating any pressure differentials between the cooling liquid and the ambient water. A filter assembly (129) mounted within the bellows relieves any pressure differential that is not relieved by the bellows when ambient water pressure is greater than that of the cooling liquid in the housing. The filter assembly removes particulate debris from the ambient water before admitting it into the housing, to relieve the pressure differential, and may further include an osmotic membrane for preventing dissolved salts in ambient water from entering the cooling liquid.

29 Claims, 3 Drawing Sheets

5,101,128

SYSTEM AND METHOD FOR COOLING A SUBMERSIBLE ELECTRIC PROPULSOR

BACKGROUND OF THE INVENTION

This invention relates to cooling systems for submersible propulsor units, and is particularly concerned with a closed system and method for cooling a propulsor unit of the type having a housing that contains a submersible stator and rotor.

Electric motor type propulsor units are known in the prior art. While such propulsor units may be used as primary propulsors for either surface ships or submarines, they find their primary application as secondary drive units for such vehicles. Originally, such secondary propulsor units were intended to be used as a backup drive in cases where the main propulsor became inoperative so that the ship or submarine could "limp" back into a port where the necessary repairs of the main propulsor unit could be carried out. More frequently, however, such secondary propulsor units are used to steer such craft during docking maneuvers since the electric motors that power them are capable of producing the low amounts of highly controlled thrust that are necessary for such maneuvers.

Prior art secondary propulsor unit are typically formed from an electric motor having a "canned" stator stationarily mounted within a torpedo-like housing. A shaft is journalled on radial bearings disposed on either end of the housing, and a canned rotor is mounted around the shaft in concentric alignment wit the stator. One of the ends of the shaft extends through the housing and has a propeller mounted thereon, while a thrust bearing is provided between the housing and the other end of the shaft for handling the thrust load generated by the propeller as it screws through the water. Because the "canned" stator and rotor are water tight, ambient sea water may flow through various openings in the housing to both dissipate the heat generated by the electric motor, as well as to cool and lubricate the thrust bearings and radial bearings disposed within the housing. One of the advantages of this prior art design is that there is no need for the relatively complex, expensive and delicate pressure-bearing shaft seals required for primary propulsor units which are necessary to prevent sea water from entering the engine room of the vessel.

Unfortunately, while there are advantages in allowing the ambient water to circulate within the housing of such propulsors, the applicants have also noted some disadvantages to this design. For example, the dissolved salts and other minerals present in ambient sea water have been found to be highly corrosive to the metallic surfaces within these housings, despite the use of anti-corrosive materials. Such corrosion typically necessitates a complete overhaul of such propulsor units every two to three years on the average, which is both time consuming and expensive, as the entire vehicle must be dry docked or at least put out of operation until such overhauls are complete. A second problem associated with the design of such prior art propulsor units is caused by the particulate debris entrained in the ambient water which is ultimately carried into the interior of the housing. Such particulate debris not only exacerbates abrasive wear between bearing surfaces; it can also collect at various locations within the interior of the housing to a point where the free circulation of water through the housing is obstructed. This last problem is rendered more acute by the increased use of such propulsors to perform docking maneuvers in relatively shallow waters where the propulsors tend to stir up silt and other types of fine particulate debris into the ambient water.

Clearly, there is a need for a secondary propulsor unit which maintains all of the advantages associated with prior art propulsor units whose housings require no expensive and delicate pressure-bearing shaft seals, but which does not allow the dissolved salts and entrained particulate debris to corrode, abrade or accumulate within the interior of the propulsor housing.

SUMMARY OF THE INVENTION

Generally speaking, the invention is a closed system and method for cooling a submersible propulsor unit for a water vehicle of the type that includes a submersible motor having a shaft connected to a propeller, and a housing containing the motor. The system overcomes or at least ameliorates all of the aforementioned problems associated with the prior art, and comprises a motor cooling assembly that includes a liquid medium contained within the housing for cooling the motor, a shaft seal for preventing ambient water from entering the housing through the opening that conducts the shaft through the housing, and a heat exchanger for thermally connecting but mechanically isolating the liquid medium from the ambient water, along with a means for recirculating the liquid medium through the heat exchanger. To help prevent any pressure differential from arising between the liquid cooling medium and the ambient water and applying a pressure load onto the shaft seal, the motor cooling assembly may further include a compliant wall structure disposed between the cooling liquid and the ambient water that deforms in response to changes in the volume of the amount of cooling liquid within the housing. In the preferred embodiment this compliant wall structure is substantially formed from a bellows.

The pressure equilibrating means may further include a filter assembly for conducting filtered ambient water into the interior of the housing and cooling liquid into the ambient water in the event that the bellows should some how fail to eliminate any pressure differential that may exist between the cooling liquid in the housing, and the ambient water. In the preferred embodiment, the filter assembly is secured within the bellows, and includes a means for preventing diffusion of ambient water into the liquid cooling medium when no pressure differential exists between the ambient water and the cooling liquid within the housing. The diffusion preventing means may be a pair of check valves disposed on the downstream side of the bellows, or an osmotic membrane disposed over the downstream side of the filter assembly, or both. In any case, the diffusion preventing means helps to prevent dissolved salts in the ambient water from entering the liquid medium inside the housing, where they might promote the occurrence of corrosion.

The propulsor unit may further include a shroud that circumscribes the propeller, as well as a plurality of struts for connecting the shroud onto the housing of the unit. In the preferred embodiment, the heat exchanger is defined by a system of interconnecting bores present in the shroud, the struts, and through the shaft that connects the propeller to the rotor. Additionally, cooling liquid is preferably a mixture of demineralized water and ethylene glycol, a liquid that has excellent heat conductive properties but which exerts less drag forces between the rotor and stator of the motor unit than ordinary water. The unit further may include a thrust bearing within the housing for bearing the thrust load applied by the propeller on the shaft against the housing, and the means for recirculating the liquid medium through the motor and the heat exchanger may be an impeller formed from a plurality of radially-disposed bores present in the runner of the thrust bearing which communicate on their inner ends with a centrally-disposed bore located in the shaft of the unit.

In operation, the bellows of the motor cooling assembly expands or contracts in volume to accommodate changes in the volume of the cooling liquid brought about thermal differential expansion. If, however, a differential pressure condition arises between the cooling liquid and the ambient water which cannot be accommodated by the bellows, this pressure may be relieved through the filter assembly, which is capable of either directing filtered ambient water into the interior of the housing, or excess cooling liquid outside the housing into the ambient water. Where the presence of such a differential pressure condition necessitates the introduction of ambient water into the housing, the filter advantageously removes any particulate debris that may be entrained in the ambient water which could damage or otherwise impair the performance of the stator and rotor disposed within the housing. If the filter assembly is equipped with an osmotic membrane, corrosion-promoting dissolved salts may also be prevented from entering the interior of the housing.

BRIEF DESCRIPTION OF THE SEVERAL FIGURES

Figure 6:
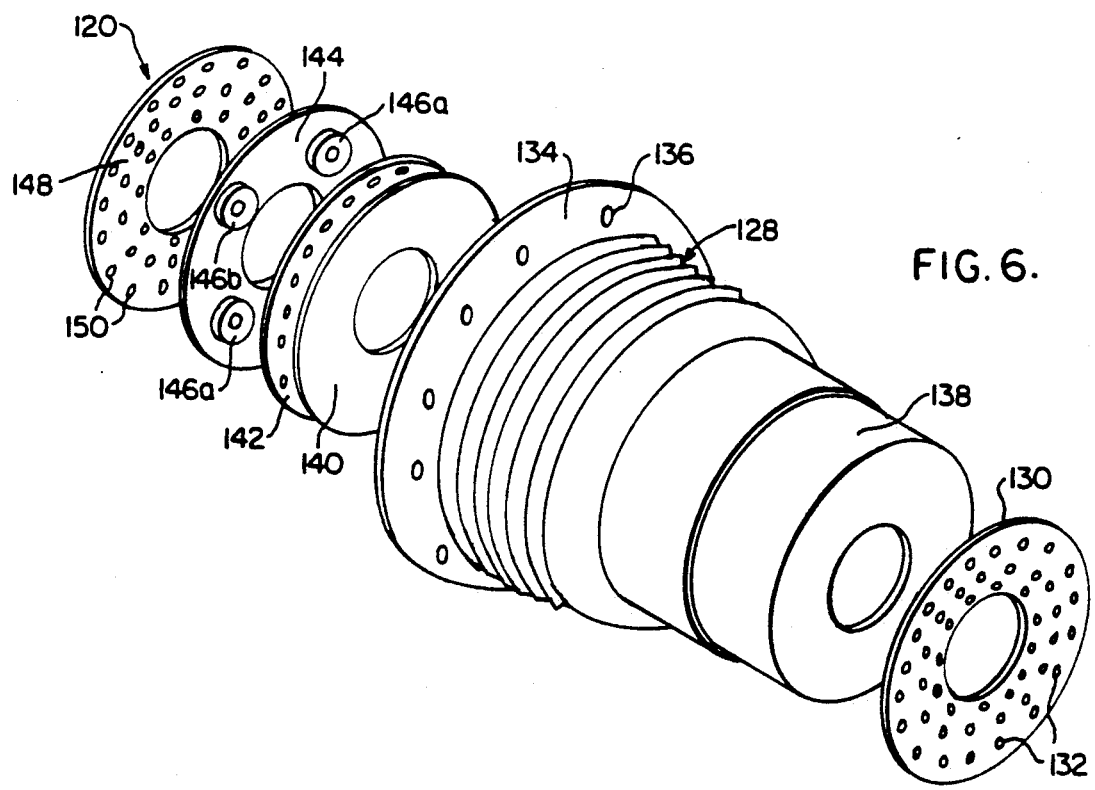
Figure 2:
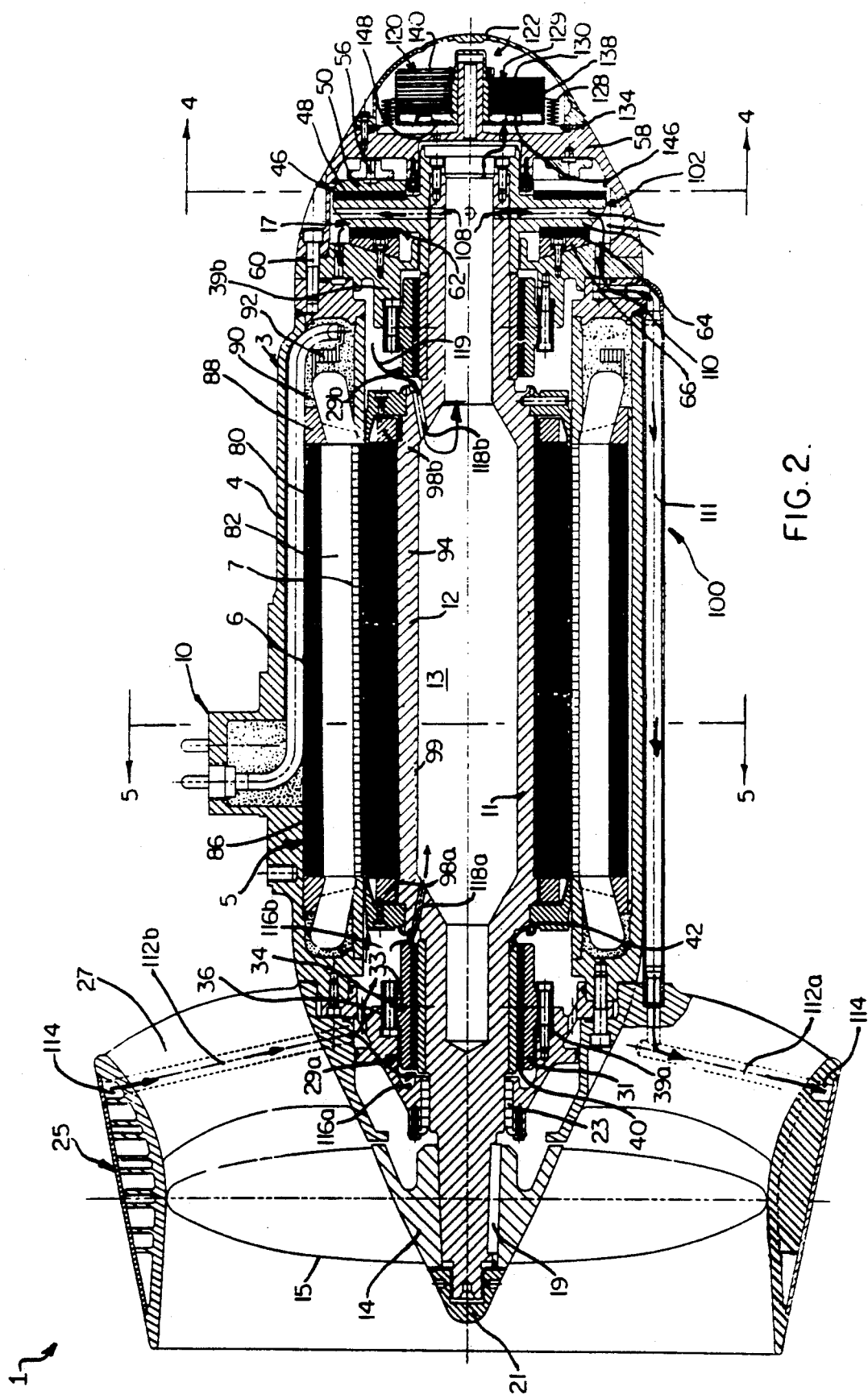
FIG. 2 is a cross sectional side view of the propulsor unit illustrated in FIG. 1, showing the motor cooling assembly of the invention.
Figure 5:
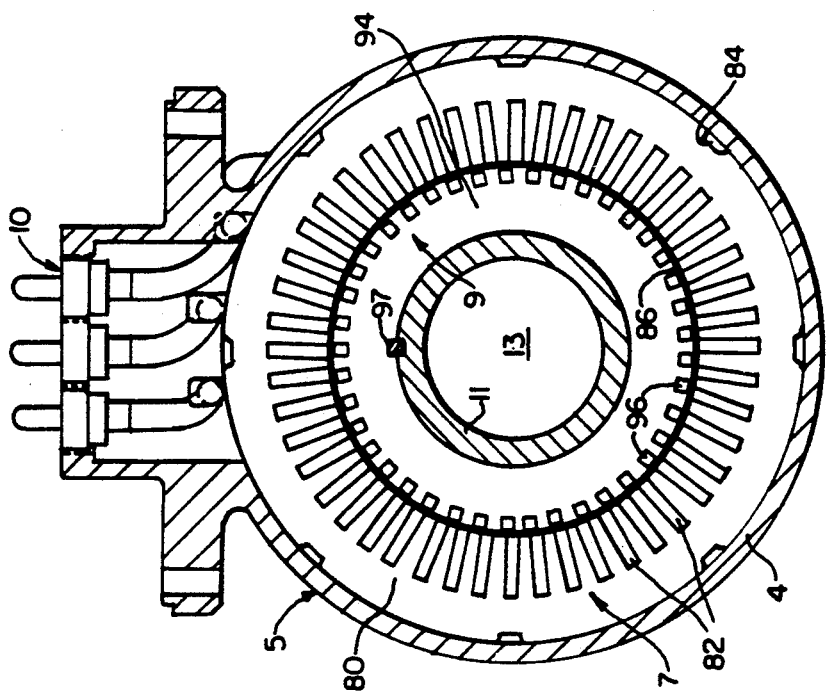

FIG. 5 is a cross-sectional view of the propulsor unit illustrated in FIG. 2 along the line 5—5 generally illustrating the details of the rotor and stator of the electric motor used in this propulsor unit, and FIG. 6 is a perspective view of the pressure equilibrating mechanism used in the motor cooling assembly of the invention, illustrating the bellows housing, the cartridge filter contained therein, the check valve, and the osmotic membrane which are used to admit and to filter ambient sea water as it enters the interior of the housing of the propulsor unit, should the pressure differential between the ambient water and the interior of the propulsor unit ever exceed a selected limit.

DETAILED DESCRIPTION OF THE PREFERRED EMBODIMENT

Figure 1:
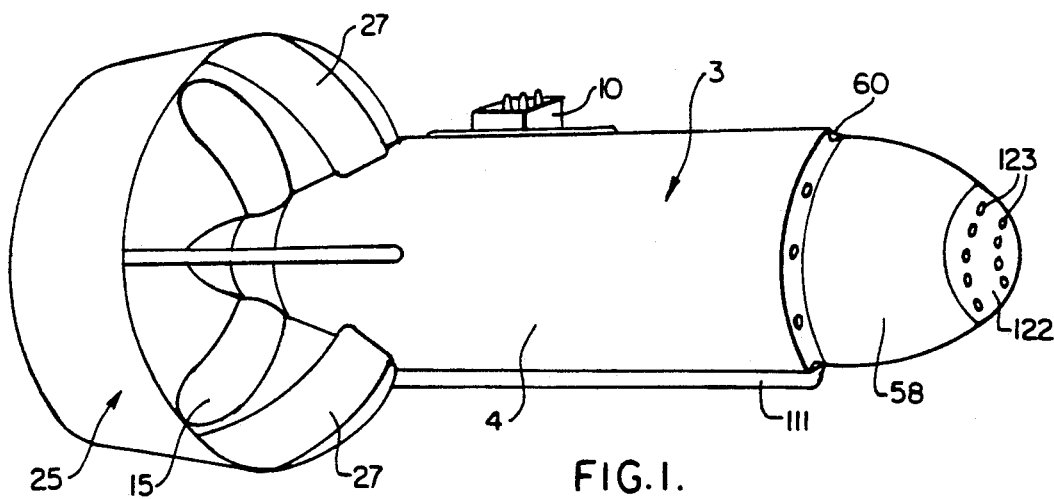
FIG. 1 is a perspective view of a type of propulsor unit which may be cooled by the system and method of the invention.

With reference now to FIGS. 1 and 2, the motor cooling assembly of the invention is particularly effective in cooling a propulsor unit 1 of the type including a torpedo-like housing assembly 3 having a main body member 4 which contains a motor 5 in its interior. The motor 5 includes a stator 7 which circumscribes the inner diameter of the main body member 4 of the housing assembly 3, as well as a rotor 9 which is concentrically disposed within the inner diameter of the stator 7 as shown. The motor 5 is a type of synchronous electric motor, and a terminal assembly 10 provides alternating current to the stator 7 in order to apply torque to the rotor 9, the rotational speed of the rotor 9 being dependent upon the frequency of the alternating current. As will be described in more detail hereinafter, both the stator 7 and the rotor 9 are "canned" so that water cannot penetrate and short-circuit any of the electrical windings in each. In prior art propulsor units, the ambient water surrounding the housing (which is often sea water) was allowed to freely circulate between the stator 7 and the rotor 9 in order to remove the heat generated by the motor 5 during its operation. In the instant invention, it is important to note that the liquid cooling medium contained within the housing assembly 3 is normally "closed" with respect to the ambient water. The preferred liquid cooling medium is an aqueous solution of ethylene glycol, which is continuously circulated through a heat exchanger integrally instructed within the housing assembly 3.

Turning now to a more specific description of the mechanical structure of the propulsor unit 1, the inner diameter of the rotor 9 of the electric motor 5 is affixed to a shaft 11 by means of a key 12. The shaft 11 advantageously has a hollow interior 13 which forms part of the heat exchanger of the cooling assembly of the invention. One end of the shaft 11 extends outside the housing assembly 3, and is connected to the hub 14 of a propeller 15. The other end of the shaft 11 is in turn connected to the runner 16 of a thrust bearing assembly 17. A key 19 and lock nut 21 secure the propeller hub 14 to the end of the shaft 11 extending outside of the housing assembly 3. Additionally, a shaft seal 23 is provided adjacent to the hub 14 of the propeller 15 to prevent ambient water from flowing into the interior of the housing assembly 3. In the preferred embodiment, the shaft seal 23 is formed from a packing material, which may be, for example, a combination of fabric impregnated with graphite particles. As will be better appreciated hereinafter, the sealing load applied to the shaft seal 23 is either zero or very slight as the liquid cooling medium contained within the housing assembly 3 is normally maintained at a very slight positive pressure with respect to the ambient water. A shroud assembly 25 circumscribes the outer periphery of the propeller 15. The inner diameter of the shroud assembly 25 defines a Kort nozzle, and the entire assembly 25 is connected to the downstream end of the housing assembly 3 by means of four struts 27 uniformly spaced 90° with respect to each other.

Figure 3:
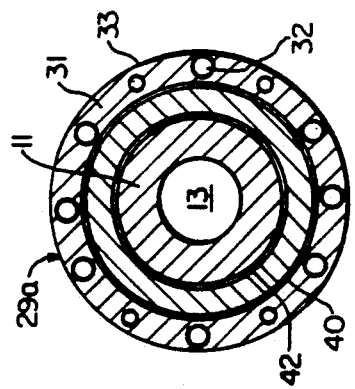
FIG. 3 is a cross-sectional view of one of the radial bearings used to journal the shaft of the propulsor illustrated in FIGS. 1 and 2, illustrating flow ports that make up part of the heat exchanger of the motor cooling assembly of the invention.

With reference now to FIGS. 2 and 3, the shaft 11 is rotatably mounted within the housing assembly 3 by means of a pair of self-aligning, radial bearing assemblies 29a,b. Each of these bearing assemblies 29a,b includes a tubular housing 31 having a plurality of through-holes 32 along its longitudinal axis for conducting the ambient cooling liquid which continuously circulates within the housing assembly 3. Each tubular housing 31 further includes an integrally formed, spherical ring 33 which fits within a complementary-shaped, concave recess 34 in a mounting ring 36. The mounting ring 36 of each of the radial bearing assemblies 29a,b is in turn secured within a bearing support member 39a,b by means of bolts as shown. A bearing ring 40 is mounted around the inner diameter of the tubular housing 31 of each of the radial bearing assemblies 29a,b. In the preferred embodiment, the bearing ring 40 is made from either hard rubber, or a self-lubricating plastic such as Teflon ®. The inner diameter of the bearing rings 40 of each of the radial bearing assemblies 29a,b surrounds a bearing sleeve 42 secured to one of the ends of the shaft 11. The bearing sleeve 42 of each of the radial bearing assemblies 29a,b is preferably formed from a hard, wear-resistant metal such as Monel ®. In operation, the bearing sleeve 42 rotates with respect to the stationarily-mounted bearing ring 40 contained within the tubular housing 31 of each of the radial bearing assemblies 29. An annular clearance of about 1 mil exists between the outer diameter of the bearing sleeve 42 and the inner diameter of the bearing ring 40 to allow the liquid cooling medium that constantly circulates within the housing assembly 3 to lubricate each of the radial bearing assemblies 29a,b with a film of liquid in this area.

Figure 4:
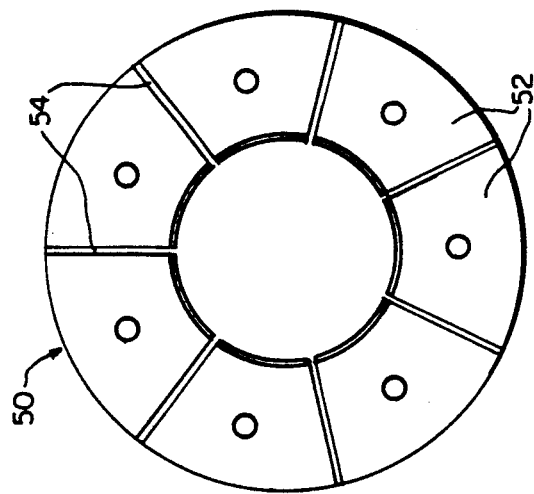
FIG. 4 is a cross-sectional view of the propulsor unit illustrated in FIG. 2 along the line 4—4 illustrating the bearing plate used in the thrust bearing assembly of the propulsor unit, and the radial slots therein which make up part of the heat exchanger flow path of the cooling assembly of the invention.

With reference now to FIGS. 2 and 4, the thrust bearing assembly 17 of the propulsor unit 1 includes a runner 16 which simultaneously functions as a runner for a primary thrust bearing 46, and a secondary thrust bearing 62. The primary thrust bearing 46 is a Kingsbury type bearing wherein the runner 16 includes a bearing pad 48 on its upstream face which rotates along with the shaft 11. In the preferred embodiment, the bearing pad 48 is formed from a hard rubber, or self-lubricating plastic such Teflon ®. The bearing pad 48 engages against a stationarily-mounted bearing plate 50. As may best be seen with respect to FIG. 4, the bearing plate 50 is formed from a plurality of plate segments 52 which are separated from one another by means of radial slots 54. These slots 54 provide flow paths for the cooling liquid which constantly circulates within the housing assembly 3 in order to both lubricate and cool the thrust bearing assembly 17. Each of the plate segments 52 is supported on its upstream side by means of a pedestal 56. The pedestals 56 are in turn mounted onto a front support member 58. The support member 58 is secured onto the main body member 4 of the housing assembly 3 by means of bolts 60. Under normal operating conditions, the thrust load generated by the propeller 15 is born by the primary thrust bearing 46 defined by the runner 16, the bearing pad 48, and the bearing plate 50. However, in instances where the propeller 15 is operated in reverse, or where the motor 5 is shut off and the propeller 15 is allowed to "windmill" in response to ambient water currents, the thrust applied to the shaft 11 by the propeller 15 will be in the opposite direction. To accommodate such oppositely-directed thrust loads, a secondary thrust bearing 62 is provided, which is formed from a bearing pad 64 mounted on the downstream face of the runner 16, and a stationarily-mounted bearing ring 66 which is mounted onto the previously-mentioned bearing support member 39b by means of bolts as shown. To render this secondary thrust bearing 62 self-aligning, the interface between the bearing ring 66 and the bearing support member 39b is formed from complementary spherical surfaces, and a small amount of play is left in the bolt connection between the ring 66 and the support member 39b to allow a small amount compliant movement between these two components.

With reference now to FIGS. 2 and 5, and a brief description of the motor 5 used to drive the propulsor unit 1, the stator 7 of the motor 5 includes a stator body 80 formed from a stack of steel plates which are laminated in such a way as to discourage the conduction of unwanted eddy currents. The inner periphery of the stator body 80 includes a plurality of slots 82 for housing stator coils (not shown). The outer periphery of the stator body 80 includes a plurality of support bars 84 that are welded within longitudinal slots that are uniformly disposed around the periphery of the stator body 80 in order to structurally integrate the steel plates that form it. The entire stator body 80 is contained within a water tight stator housing 86. As is best seen in FIG. 2, the sides of the stator housing 86 are defined by finger plates 88 on either side of the stator body 80. Sand potting material 90 forms a rigid matrix into which a ring collector 92 is embedded. The purpose of the ring collector 92 is, of course, to conduct the alternating current that flows through the terminal assembly 10 to the various stator coils disposed within the slots 82 in the stator body 80. The purpose of the sand potting 90 that surrounds the ring collector 92 is to render the surrounding stator housing 86 more resistant to ambient pressure by removing all of the cavities which would otherwise be present in the regions surrounding collector 92.

The rotor 9 includes a rotor body 94 that again is formed from a stack of laminated, circular steel plates. Around its outer periphery, the rotor body 94 includes a series of longitudinal slots for receiving longitudinally-oriented conductive bars 96. The inner periphery of the rotor body 94 is secured onto the shaft 11 by means of a key 97. Collector rings 98a,b interconnect the ends of the conductive bars 96. Like the previously described stator body 80, the rotor body is likewise canned within a water tight rotor housing 99. In operation, the coils within the stator body 80 electromagnetically induce currents within the conductive bars 96 such that a torque is generated within the rotor 9 in accordance with the well known principles governing synchronous type, a.c. motors.

With reference now to FIGS. 2 and 6, the motor cooling assembly of the invention generally comprises the previously mentioned shaft seal 23, an impeller 102 for circulating a liquid cooling medium within the housing assembly 3, a heat exchanger 106 for dissipating the heat absorbed by this cooling medium, and a pressure equilibrating mechanism 120 for preventing the occurrence of any significant differential pressure between the cooling liquid in the interior housing assembly 3, and the water surrounding the propulsor unit 1. The impeller 102 is formed from the previously mentioned runner 16 of the thrust bearing assembly 17. This runner 16 includes a plurality of radially disposed bores 104. The centrifugal force applied to any liquid present in these radially disposed bores 104 creates a pressure differential between the inner and the outer ends of these bores whenever the motor 5 operates to turn the shaft 11.

The pressure differential created by the impeller 102 circulates the cooling liquid present within the housing assembly 3 throughout a network of passages and bores which ultimately come into thermal contact with the ambient water, and which define the previously mentioned heat exchanger 106. A major flow path of the heat exchanger 106 is the previously hollow interior 13 of the shaft 11. A plurality of radially-oriented bores 108 present at the upstream end of the shaft 11 fluidly connect this hollow interior 13 with the inner ends of the radially disposed bores 104 of the impeller 102, while the outer ends of these radially disposed bores 104 communicate with an annular space 109 that circumscribes the outer edge of the runner 16 as shown. Cooling liquid that has been pumped out of the outer edge of the impeller 102 flows through a connecting bore 110 into a radiator tube 111 as shown. the radiator tube 111 is preferably formed from a highly heat conductive metal, such as aluminum or copper (or a copper alloy), and is surrounded by the ambient water as shown. While the radiator tube 111 is illustrated as being straight in FIG. 2, it may in the alternative assume a serpentine shape in order to improve its heat-dissipation ability. The radiator tube 111 terminates in the shroud assembly 25. A bore 112a in the lowermost strut 27 conducts the cooling liquid into a passageway 114 that circumscribes the shroud assembly 25. This passageway 114 interconnects with a bore 112b located in the uppermost strut 27, and in turn conducts the circulating cooling liquid back into the housing assembly 3 to the annular spaces 116a,b. The pressure behind the cooling liquid flowing into annular space 116a forces it through the holes 32 of the self-aligning, radial bearing assembly 29a as well as through the annular space between the bearing sleeve 42, and ring 40 of this assembly in order to both cool it and to lubricate it. Hence, the cooling liquid flowing to the annular space 116a ultimately ends up in the annular space 116b. The pressure behind the cooling liquid flowing into annular space 116b forces it between the stator 5 and the rotor 7, and also through a bore 118a located in the shaft 11. Liquid flowing through bore 118a can ultimately recirculate back into the impeller 102 as illustrated by the flow arrows. Cooling liquid that flows between the stator 5 and the rotor 7 ultimately ends up in the annular space 119, where it in turn flows through bore 118b in the shaft 11 and back to the hollow interior 13 of the shaft 11, where it can be recirculated by the impeller 102. The impeller 102 further forces cooling liquid between the moving surfaces of both the primary thrust bearing 46 and the secondary thrust bearing 62 in order to both cool and to lubricate these bearings. However, a more specific description of the precise flow patterns through these thrust bearings will not be given, as this particular part of the flow path of the cooling liquid forms no part of the instant invention.

With reference now to FIGS. 2 and 6, the pressure equilibrating mechanism 120 of the motor cooling assembly is located between a front cap member 122 that defines the upstream end of the housing assembly 3, and the previously mentioned front support member 58. The front cap member 122 includes a plurality of flow ports 123 (as best seen in FIG. 1) for conducting ambient water all around the exterior of the mechanism 120. A spindle 124 projects out of a central portion of the front support member 58 for supporting the pressure equilibrating mechanism 120, and a lock nut 126 secures the mechanism 120 in place.

The pressure equilibrating mechanism 120 generally comprises a bellows housing 128 and a filter assembly 129 including a cartridge filter 138, an osmotic membrane 140, and check valves 146a,b. All of the components of the bellows housing 128 and filter assembly 129 have a centrally disposed bore or aperture for receiving the spindle 124. The bellows housing 128 has a front support plate 130 secured thereto in a water tight relationship. The front support plate 130 includes a plurality of apertures 132 for either admitting ambient water into the bellows housing 128, or cooling liquid from the housing assembly 3 out into the ambient water in the event that a pressure differential of above a selected value should occur between the cooling liquid and the ambient water. Such a pressure differential is not, however, expected to occur under normal circumstances in view of the compliant properties of the bellows housing 128, which housing 128 should either expand or contract to accommodate any such pressure differentials. In operation, the resilient properties of the walls of the bellows housing applies a very slight positive pressure on the cooling liquid within the housing assembly 3 that discourages any diffusion of ambient water through the shaft seal 23. The bellows housing 128 terminates in a rear mounting ring 134 having a plurality of bolt holes 136 which allow the housing 128 to be secured to the front support member 58 by means of bolts as shown.

Turning now to the filter assembly 129, a cartridge filter 138 is disposed within the interior of the generally cylindrical bellows housing 128. In the preferred embodiment, the porosity of the cartridge filter 138 would be chosen so that it would not conduct any particulate matter greater than about one micron in diameter (assuming that a pressure differential occurred which caused ambient water to flow through the check valves 132 of the front support plate 130). An osmotic membrane 140 is disposed around the downstream side of the cartridge filter 138. The membrane 140 serves to prevent dissolved salts from any water flowing through the cartridge filter 138 from entering the cooling liquid present within the housing assembly 3. This membrane is supported by a perforated support plate 142 that forms the back side of the pressure equilibrating mechanism 120. Located on the downstream side of the perforated membrane support plate is a check valve support plate 144 which supports two sets of check valves 146a,b. The check valves 146a admit ambient water into the housing when the pressure of the ambient water exceeds the pressure of the cooling liquid by a predetermined amount, while the check valves 146b admit cooling liquid into the ambient water when the pressure of this liquid exceeds the pressure of the ambient water by a predetermined amount. In order to make sure that ambient water does not flow into the housing assembly 3 through the shaft seal 23, the threshold differential pressure that actuates the check valves 132 should be less than the pressure at which the shaft seal 23 conducts any significant amount of liquid. The positioning of the osmotic membrane 140 downstream of the cartridge filter 138 prevents particulate debris from accumulating over the surface of the membrane 140, and thereby impairing its function, while the positioning of the check valves 146a,b downstream of both the cartridge filter 138 and the membrane 140 protects the valve mechanisms from both particulate debris and dissolved salts. Finally, the pressure equilibrating mechanism is provided with a rear support plate 148 having liquid conducting apertures 150. The plate 148 serves as a bottom lid which keeps the cartridge filter 138, the membrane 140, membrane support plate 142, and check valve support plate 144 closely stacked together within the bellows housing 128.

Of course the invention is not limited to the specifically illustrated embodiment. For example, it is possible for the filter assembly 129 to include either the check valves 146a,b or the osmotic membrane 140, but not necessarily both. Also, if the radiator tube 111 is made serpentine, it may not be necessary to circulate the cooling liquid through the shroud assembly 25.

I claim:

1. A closed system for cooling a submersible propulsor unit for a water vehicle of the type including a submersible motor having a shaft connected to a propeller, a housing containing said motor, and a bearing within said housing for rotatably mounting said propeller to said shaft, comprising:

a motor cooling assembly, including a shaft seal for conducting said shaft outside of said housing while preventing ambient water from entering said housing, a liquid medium contained within said housing for cooling said motor and lubricating said bearing, a heat exchanger for thermally connecting but mechanically isolating said liquid medium from ambient water, and a means for recirculating said liquid medium through said heat exchanger, and means for equilibrating the pressure of the liquid within the housing with the ambient water on the outside of said housing.

2. A method for cooling a submersible propulsor unit for a water vehicle, wherein the propulsor includes a submersible motor having a shaft connected to a propeller, and a housing containing said motor and a compliant wall structure including a shaft seal for conducting said shaft outside of said housing while preventing ambient water from entering said housing, comprising the steps of circulating a liquid cooling medium within said housing around said submersible motor to remove heat generated by said motor;

circulating said liquid cooling medium through a heat exchanger that mechanically isolates said liquid cooling medium from ambient water but that is in thermal contact with ambient water to dissipate said heat into said water, and constantly equilibrating the differential pressure between said cooling liquid and said ambient water by deforming said compliant wall structure when said differential pressure is above a selected value.

3. A closed system for cooling as defined in claim 1, wherein said pressure equilibrating means includes a compliant wall structure disposed between said cooling liquid and said ambient water that deforms in response to changes in the volume of the amount of liquid within said housing.

4. A closed system for cooling as defined in claim 3, wherein said compliant wall structure is formed from a bellows.

5. A closed system for cooling as defined in claim 1, wherein said recirculation means is an impeller-type pump driven by said shaft.

6. A closed system for cooling as defined in claim 5, further comprising a thrust bearing within said housing having a runner for bearing the thrust load applied by the propeller on said shaft against said housing, wherein said runner functions as the impeller of said pump.

7. A closed system for cooling as defined in claim 1, wherein said heat exchanger includes at least one tube mounted on the exterior of the housing.

8. A closed system for cooling as defined in claim 1, further comprising a shroud that circumscribes the propeller and which includes a plurality of strut members for connecting the shroud to the housing, and wherein said heat exchanger is defined in part by a interconnecting liquid flow paths present in said shroud and strut members that communicate with the interior of said housing.

9. A closed system for cooling as defined in claim 7, wherein said pressure equilibrating means further includes a filter assembly for conducting filtered ambient water into the interior of the housing and cooling liquid into said ambient water in the event of a pressure differential between said housing and said ambient water.

10. A closed system for cooling as defined in claim 1, wherein said liquid medium is an aqueous solution of ethylene glycol.

11. A closed system for cooling a submersible propulsor unit for a water vehicle, wherein said unit includes a motor having a submersible stator and a submersible rotor and a shaft connected to said rotor and having one end connected to a propeller, and a housing containing said motor, comprising:

a motor cooling assembly including a shaft seal for conducting said shaft outside of said housing while preventing ambient water from entering said housing, a liquid medium contained within said housing and communicating with said stator and rotor, a heat exchanger for thermally connecting but mechanically isolating said liquid medium from said ambient water, a means for recirculating said liquid medium through said heat exchanger, a means for equilibrating the pressure of the liquid within the housing with the ambient water one the outside of said housing, and a filter assembly mounted within said housing for conducting filtered ambient water into the interior of the housing and cooling liquid into said ambient water in the event that a pressure differential occurs between the liquid in said housing and said ambient water.

12. A closed system for cooling a submersible propulsor unit for a water vehicle of the type including a submersible motor having a shaft connected to a propeller, and a housing containing said motor, comprising:

a motor cooling assembly, including a shaft seal for conducting said shaft outside of said housing while preventing ambient water from entering said housing, a liquid medium contained within said housing for cooling said motor, a heat exchanger for thermally connecting but mechanically isolating said liquid medium from ambient water, an impeller type pump for recirculating said liquid medium through said heat exchanger, and a thrust bearing within said housing having a runner for bearing the thrust load applied by the propeller on said shaft against said housing, wherein said runner functions as said impeller type pump.

13. A closed system for cooling as defined in claim 11, wherein said filter assembly includes means for preventing diffusion of said ambient water into said liquid cooling medium when no pressure differential exists between said ambient water and said housing.

14. A closed system for cooling as defined in claim 13, wherein said diffusion preventing means includes at least one check valve.

15. A closed system for cooling as defined in claim 13, wherein said diffusion preventing means includes an osmotic membrane.

16. A closed system for cooling as defined in claim 11, wherein said pressure equilibrating means includes a bellows disposed between said cooling liquid and said ambient water, and said filter assembly is disposed within said bellows.

17. A closed system for cooling as defined in claim 11, further comprising a shroud that circumscribes the propeller and which includes a plurality of strut members for connecting the shroud to the housing, and wherein said heat exchanger is defined in part by a interconnecting liquid flow paths present in said shroud and strut members that communicate with the interior of said housing.

18. A closed system for cooling as defined in claim 17, wherein said shaft includes a flow path that communicates with said interconnecting flow paths in said strut members and shroud to define another part of said heat exchanger.

19. A closed system for cooling as defined in claim 11, wherein said recirculation means is an impeller-type pump driven by said output shaft.

20. A closed system for cooling as defined in claim 19, further comprising a thrust bearing within said housing having a runner for bearing the thrust load applied by the propeller on said shaft against said housing, wherein said runner functions as the impeller of said pump.

21. A closed system for cooling a submersible propulsor unit for a water vehicle, wherein said unit includes a motor having a submersible stator and a submersible rotor and a shaft connected to said rotor and having one end connected to a propeller, and a housing containing said motor, comprising:

a motor cooling assembly, including a shaft seal for conducting said shaft outside of said housing while preventing ambient water from entering said housing, a liquid medium contained within said housing and communicating with said stator and rotor, a heat exchanger for thermally connecting but mechanically isolating said liquid medium form ambient water, an impeller means connected to said shaft for recirculating said liquid medium through said heat exchanger, a means including a compliant wall for equilibrating the pressure of the liquid within the housing with the ambient water on the outside of said housing, and a filter assembly mounted within said housing for conducting filtered ambient water into the interior of the housing and cooling liquid into said ambient water in the event that a pressure differential occurs between the liquid in said housing and said ambient water.

22. A closed system for cooling as defined in claim 21, further comprising a shroud disposed around said propeller and a plurality of struts for connecting said shroud to said housing, and wherein said heat exchanger is defined by interconnecting bores present in said shroud, struts and said shaft.

23. A closed system for cooling as defined in claim 21, wherein said filter assembly includes means for preventing diffusion of said ambient water into said liquid cooling medium when no pressure differential exists between said ambient water and said housing.

24. A closed system for cooling as defined in claim 23, wherein said diffusion preventing means includes an osmotic membrane.

25. A closed system for cooling as defined in claim 21, wherein said pressure equilibrating means includes a bellows disposed between said cooling liquid and said ambient water, and said filter assembly is disposed within said bellows.

26. A method for cooling a submersible propulsor unit for a water vehicle, wherein the propulsor includes a submersible motor having a shaft connected to a propeller, and a housing containing said motor and including a shaft seal for conducting said shaft outside of said housing while preventing ambient water from entering said housing, comprising the steps of circulating a liquid cooling medium within said housing around said submersible motor to remove heat generated by said motor;

circulating said liquid cooling medium through a heat exchanger that mechanically isolates said liquid cooling medium from ambient water but that is in thermal contact with ambient water to dissipate said heat into said water, and constantly equilibrating the differential pressure between said cooling liquid and said ambient water by admitting cooling liquid into said ambient water and ambient water into said cooling liquid when said differential pressure rises above a selected value.

27. A method for cooling as defined in claim 26, wherein said housing includes a compliant wall structure, and wherein said differential pressure is equilibrated by deforming said compliant wall structure when said pressure is below said selected value.

28. A method for cooling as defined in claim 27, further including the step of filtering ambient water that flows into said housing to remove particulate matter therefrom.

29. A method for cooling as defined in claim 28, further including the step of conducting said ambient water through an osmotic membrane to remove dissolved salts from said ambient water.

* * * * *